5691X
H Finlay. Sheet 1. 3 Sheets.
Car Truck.
No
Patented Oct. 27, 1829.
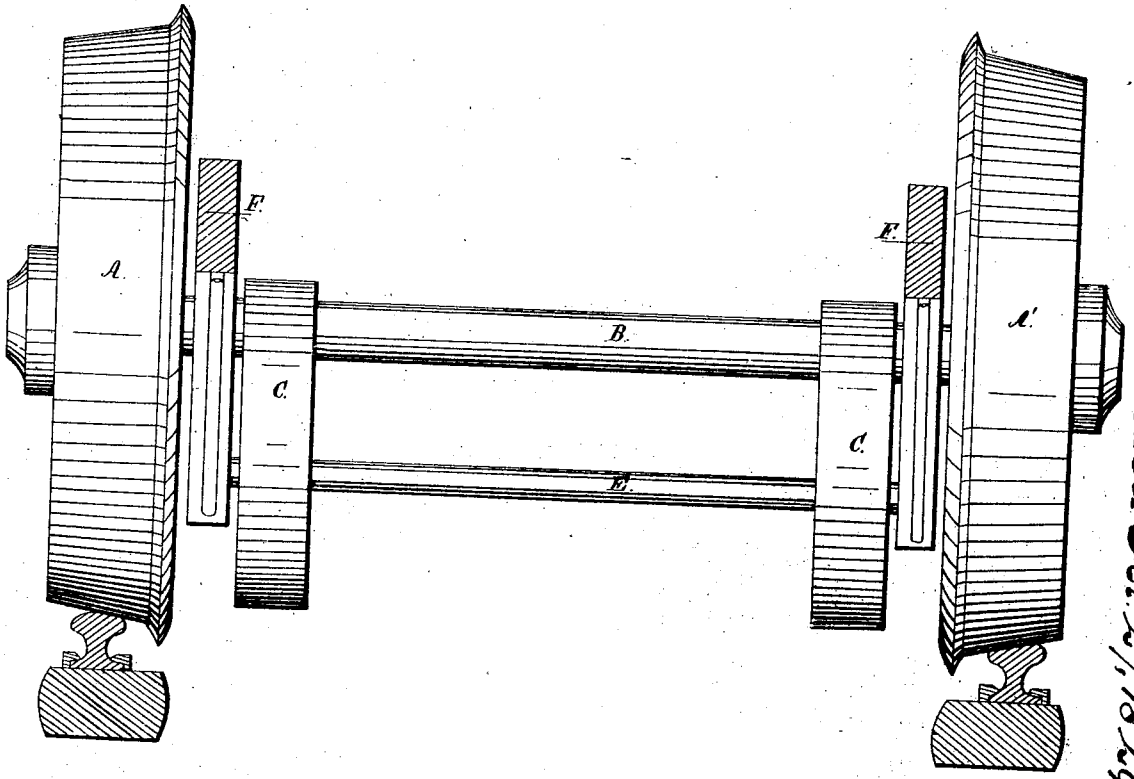

5691X
H. Finlay. Sheet 2, 3 Sheets.
Car Truck.
No
Patented Oct. 27, 1829.
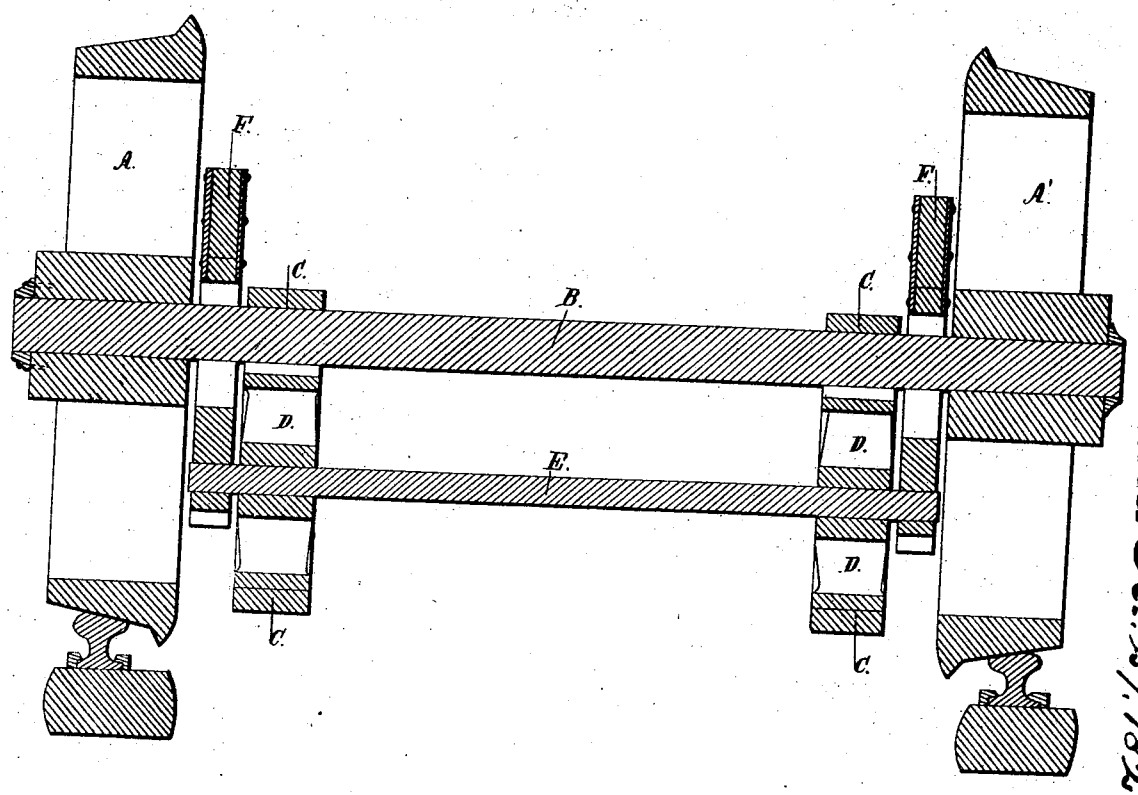

5691X
H. Finlay. Sheet 3. 3 Sheets.
Car Truck.
No.
Patented Oct. 27, 1829.
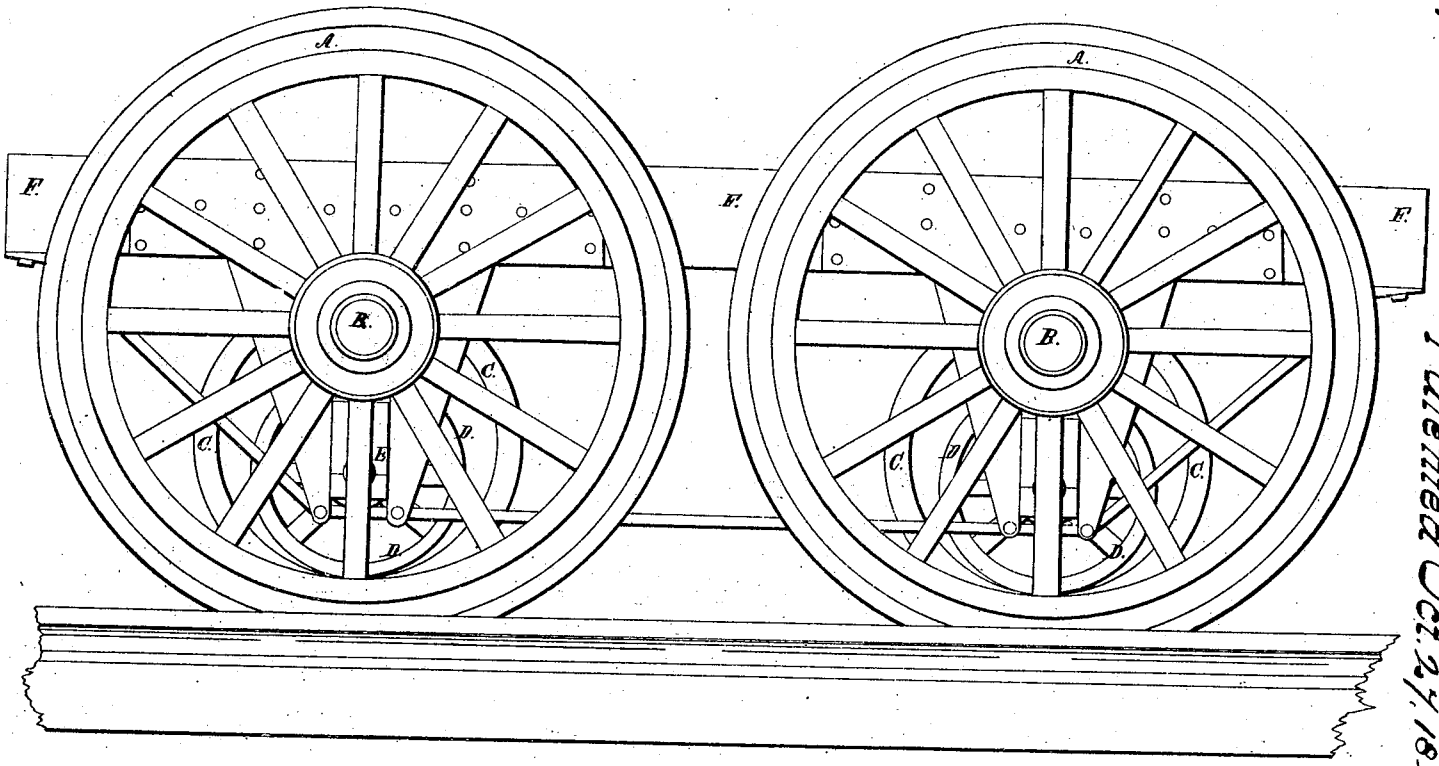

United States Patent Office

PTO - BOYERS, PA Duty Station

MISSING PAGE TEMPORARY NOTICE

PATENT # 5691X FOR ISSUE DATE 10-27-1829

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

[illegible]

Data Conversion Operation

Boyers, Pa